US012316742B2

(12) United States Patent
Bilgin et al.

(10) Patent No.: US 12,316,742 B2
(45) Date of Patent: May 27, 2025

(54) HARDWARE CIRCUIT TO PERFORM ROUND COMPUTATIONS OF ARX-BASED STREAM CIPHERS

(71) Applicant: Cryptography Research, Inc., Sunnyvale, CA (US)

(72) Inventors: Begül Bilgin, Leuven (NL); Michael Hutter, Walnut Creek, CA (US)

(73) Assignee: Cryptography Research, Inc., San Jose, CA (US)

( * ) Notice: Subject to any disclaimer, the term of this patent is extended or adjusted under 35 U.S.C. 154(b) by 1393 days.

(21) Appl. No.: 15/856,682

(22) Filed: Dec. 28, 2017

(65) Prior Publication Data

US 2018/0212761 A1     Jul. 26, 2018

Related U.S. Application Data

(60) Provisional application No. 62/478,308, filed on Mar. 29, 2017, provisional application No. 62/449,516, filed on Jan. 23, 2017.

(51) Int. Cl.
*H04L 9/00* (2022.01)
*H04L 9/06* (2006.01)
*H04L 9/08* (2006.01)

(52) U.S. Cl.
CPC .......... *H04L 9/0631* (2013.01); *H04L 9/0625* (2013.01); *H04L 9/065* (2013.01); *H04L 9/0861* (2013.01)

(58) Field of Classification Search
CPC ..... H04L 9/0625; H04L 9/0631; H04L 9/065; H04L 9/0861
See application file for complete search history.

(56) References Cited

U.S. PATENT DOCUMENTS 8,649,518 B1    2/2014  Langhammer
9,160,520 B1 *  10/2015 Hwang ................. G11C 7/222
(Continued)

FOREIGN PATENT DOCUMENTS

WO    WO 2007/060587      *  5/2007   ............... H04L 9/18
WO    WO-2007060587 A1 *  5/2007   ........... H04L 9/0631

OTHER PUBLICATIONS

Sobti, Rajeev, and Geetha Ganesan. "Analysis of quarter rounds of Salsa and ChaCha core and proposal of an alternative design to maximize diffusion." Indian Journal of Science and Technology 9.3 (2016): pp. 3-5. (Year: 2016).*

(Continued)

*Primary Examiner* — Syed M Ahsan
(74) *Attorney, Agent, or Firm* — Lowenstein Sandler LLP

(57) ABSTRACT

Systems and methods for efficient computation of stream ciphers. An example system for implementing a stream cipher, may comprise: a sub-round computation circuit of a first type configured to perform a subset of transformations of a cipher computation round on a round input state, each transformation of the subset of transformations including at least one of: a bitwise addition operation, a bitwise exclusive disjunction operation, or a bitwise rotation operation. The sub-round computation circuit of the first type may comprise: one or more of sub-round computation circuits of a second type, wherein each sub-round computation circuit of the second type is configured to perform the subset of transformations of the cipher computation round on a respective part of the round input state.

7 Claims, 7 Drawing Sheets

(56) References Cited

U.S. PATENT DOCUMENTS

| | | | | |
|---|---|---|---|---|
| 2014/0198913 | A1* | 7/2014 | Rose | H04L 9/0816 380/44 |
| 2017/0353298 | A1* | 12/2017 | Ghosh | H04L 9/14 |
| 2018/0176011 | A1* | 6/2018 | Hars | H04L 9/0861 |

OTHER PUBLICATIONS

Sobti, Rajeev, and Geetha Ganesan. "Analysis of Quarter Rounds of Salsa and ChaCha Core and Proposal of an Alternative Design to Maximize Diffusion (Only Abstract)." (2016). (Year: 2016).*

Sobti et al., Jan. 2016, "Analysis of Qaurter Rounds of Salsa and ChaCha Core and Proposal of an Alternative Design to Maximize Diffusion" (Year: 2016).*

Geltink et al., "FPGA Implementation of HS1-SIV"—p. 46 (Year: 2016).*

Geltink, Gerben, and Sergei Volokitin. "FPGA Implementation of HS1-SIV." SECRYPT. 2016. (Year: 2016).*

Sobti, Rajeev, and Geetha Ganesan. "Analysis of quarter rounds of Salsa and ChaCha core and proposal of an alternative design to maximize diffusion." Indian Journal of Science and Technology 9.3 (2016): 1-10. (Year: 2016).*

Analysis of quarter rounds of salsa and chacha core and proposal of an alternative design to maximize diffusion (Year: 2016).*

Daniel Bernstain. "ChaCha, a variant of Salsa20". The university of Illinois Department of Mathematics, statistics, and computer Science Retrieved from http://cr.yp.to/chacha.html.

Jovanovic Philipp, "Analysis and Design of Symmetric Cryptographic Algorithms", Dissertation, University PASSAU faculty of Computer Science and mathematics, May 2015.

L. Henzen, F. C. (2008). VLSI Hardware Evaluation of the Stream Ciphers. International Conference on Signals, Circuits and Systems.

Leon Botros, "Optimizing NORX for ATMEL 8-BIT AVR Microcontrollers", Bachelor Thesis, Radboud University, Mar. 13, 2015.

Sobti Rajeev et al., "Analysis of Quarter Rounds of Salsa and ChaCha Core and Proposal of an Alternative Design to Maximize Diffusion", Indian Journal of Science and Technology vol. 9(3), Jan. 2016.

* cited by examiner

HARDWARE CIRCUIT TO PERFORM ROUND COMPUTATIONS OF ARX-BASED STREAM CIPHERS

RELATED APPLICATIONS

This application claims the benefit of U.S. Provisional Application No. 62/449,516 filed Jan. 23, 2017, titled "Efficient ChaCha20 Round Calculations" and U.S. Provisional Application No. 62/478,308 filed Mar. 29, 2017, titled "Hardware Circuit to Perform Round Computations of ARX-based Stream Ciphers." Both above referenced provisional applications are incorporated herein by reference in their respective entireties.

TECHNICAL FIELD

The present disclosure is generally related to computer systems, and is more specifically related to cryptographic data processing systems and methods.

BACKGROUND

Since the advent of computers, constantly evolving have been not only various systems and methods for safeguarding cryptographic keys and/or other sensitive data, but also systems and methods for gaining unauthorized access to the protected data, ranging from conceptually unsophisticated brute force password cracking to complex external monitoring attacks.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
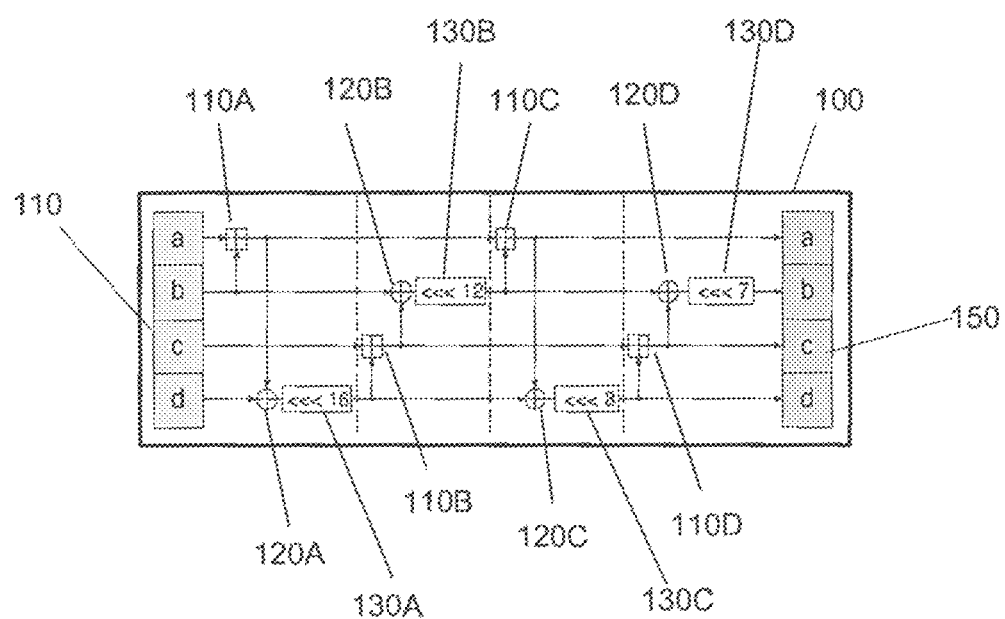
FIG. 1 schematically illustrates an example circuit for implementing a quarter-round (QR) operation, in accordance with one or more aspects of the present disclosure.

Described herein are systems and methods for efficient computation of stream ciphers. "Stream cipher" herein shall refer to a symmetric key cipher where plaintext bits are combined with key stream bits that are serially generated from a random seed value.

In various illustrative examples described herein below, cryptographic data processing devices may be employed for implementing cryptographic operations utilizing ChaCha20 cipher. However, the systems and methods described herein for performing cryptographic data processing operations in a manner resistant to external monitoring attacks may be applicable to various other cryptographic data processing devices and methods.

The systems and methods described herein may be implemented by hardware (e.g., general purpose and/or specialized processing devices, and/or other devices and associated circuitry), software (e.g., instructions executable by a processing device), or a combination thereof. Various aspects of the methods and systems are described herein by way of examples, rather than by way of limitation.

ChaCha is a symmetric key-based cryptographic method which is used in many applications, such as OpenSSL and OpenSSH for encryption and in OpenBSD for random number generation. ChaCha produces a ciphertext by combining a plaintext with a generated key stream. Conversely, the decryption operation involves combining the ciphertext with the key stream to produce the plaintext. The keystream is produced by performing a sequence of rounds to transform the round state. The transformations include addition, rotation, and exclusive disjunction (also referred to as exclusive OR, XOR) (ARX) operations. The round state may include a secret key, an initialization vector (also referred to as nonce), a counter value, and a constant value. The initialization vector may be represented by a random bit sequence. The counter value may be initialized by a pre-defined value (e.g., zero) and incremented at each round.

ChaCha20 is an instance of ChaCha performing 20 rounds on the input state. The 512-bit round state includes a concatenation of a 256-bit key, a 96-bit initialization vector, a 32-bit counter value, and a 128-bit constant value. The round input state may be represented as a 4×4 square matrix of 32-bit words. ChaCha20 runs 20 rounds to invertibly transform the matrix, alternating between "column rounds" and "diagonal rounds". The resulting matrix is then added to the original matrix to obtain the output of sixteen 32-bit output words, which is used to encrypt/decrypt a byte-multiple sized input of no more than 512 bits.

The basic operation of ChaCha20 is the quarter round (QR). It operates on the 128-bit (i.e., one fourth of the size of ChaCha20 state) input state that is composed of four 32-bit unsigned integers, denoted a, b, c, and d:

a+=b; d^=a; d<<=16;
c+=d; b^=c; b<<=12;
a+=b; d^=a; d<<=8; and
c+=d; b^=c; b<<=7, where "+" denotes integer addition modulo 2^32 operation, "^" denotes a bitwise exclusive disjunction operation, and "<<n" denotes an n-bit left rotation (towards the most significant bits). In order to perform a full ChaCha20 round, the round state may be split into four parts (e.g., represented by the columns of the round state matrix), and four QR operations may be performed, in parallel or sequentially, on the four parts of the round state.

FIG. 1 schematically illustrates an example circuit for implementing the above-described QR operation. As schematically illustrated by FIG. 1, the example QR circuit 100 accepts the 128-bit input state 110 composed of four 32-bit words a, b, c, d and processes the input state by four ARX operations implemented by four adders 110A-110D, four XOR circuits 120A-120D, and four rotating logic circuits 130A-130D to produce the output state 150.

Common hardware-based implementations of ChaCha20 reduce the processing latency at the cost of the implementation size, while attempts to reduce the implementation size produce higher latencies. Systems and methods of the present disclosure reduce the implementation area and the critical path of the circuitry implementing the stream ciphers. In certain implementations, four quarter half-round (QHR) circuits operating in parallel may be employed to implement a half-round (HR) operation, which performs two ARX operations on the 512-bit input state using the same number of ARX circuits as two quarter round (QR) operations running in parallel, while reducing by a half the critical path (i.e., the longest path across the implementing circuit), as described in more details herein below.

In order to implement the cipher in an efficient manner, all rounds of the cipher should be performed within the number of cycles that does not exceed the number of input words that can be loaded into the processing core via the core interface (i.e., one clock cycle per input word), thus avoid introduction of idle cycles. In the example of ChaCha20, which performs twenty rounds to produce a 512-bit key stream, and assuming the width of the internal bus of 32 bits, the twenty rounds should be completed in sixteen clock cycles or less. In accordance with one or more aspects of the present disclosure, a triple half-round (THR) circuit is implemented for executing three HR functions within one clock cycle. Therefore, 39 half-rounds of the 40 half-rounds of ChaCha20 cipher would be executed within 13 clock cycles, and the remaining half-round operation would be completed another clock cycle, thus requiring 14 clock cycles for processing the 512-bit input state, as described in more details herein below.

Figure 2:
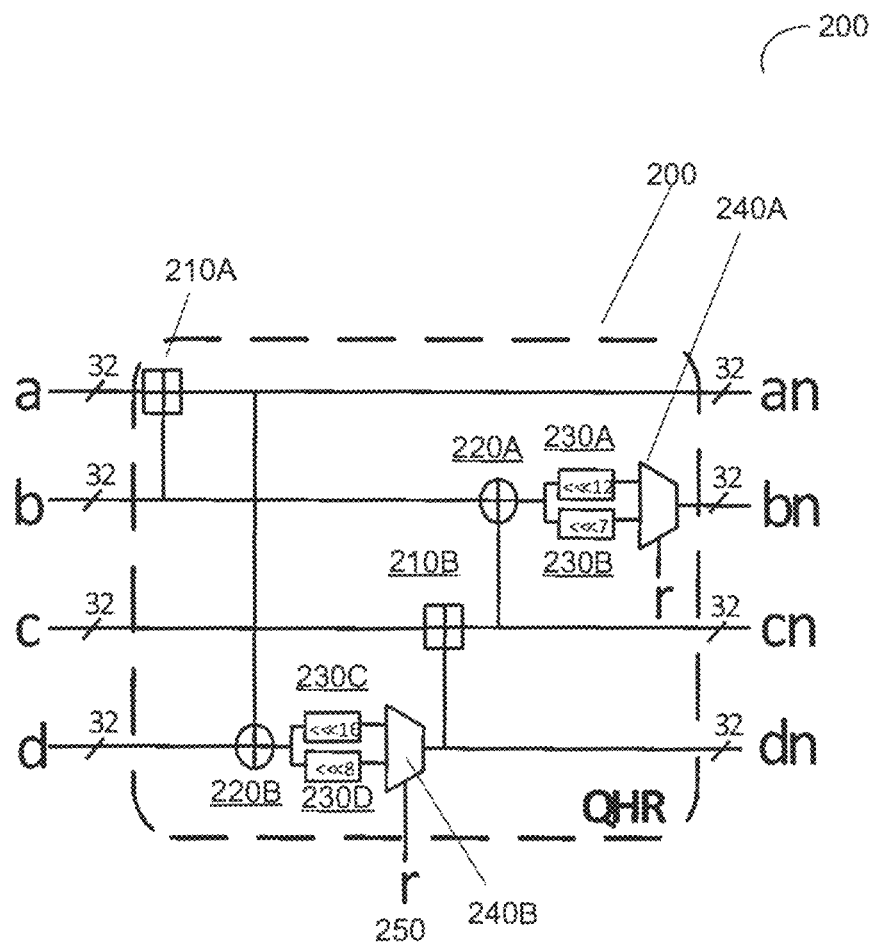
FIG. 2 schematically illustrates an example circuit for implementing the QHR operation, in accordance with one or more aspects of the present disclosure.

Systems and methods described herein utilize a quarter half-round (QHR) computation circuit. The QHR operation may be defined as implementing two of the four ARX operations that are performed by the above-described QR operation. FIG. 2 schematically illustrates an example circuit for implementing the QHR operation, in accordance with one or more aspects of the present disclosure. As schematically illustrated by FIG. 2, the example QHR circuit 200 accepts four 32-bit words a, b, c, d and processes the input state by two ARX operations implemented by two adders 210A-210B, two XOR circuits 220A-220B, and four rotating logic circuits 230A-230D, such that each pair of rotating logic circuits is coupled to a respective multiplexer 240A and 240B. The multiplexers are controlled by a clock-driven signal r (250), which indicates the parity of the clock cycle sequential number: the signal 250 is set to 0 at even clock cycles and set to 1 at odd clock cycles. Thus, during an even clock cycle, the QHR circuit 200 performs the first two operations of the quarter round:

a+=b; d^=a; d<<=16
c+=d; b^=c; b<<=12, while during an odd clock cycle, the QHR circuit 200 performs the last two operations of the quarter round:

a+=b; d^=a; d<<=8
c+=d; b^=c; b<<=7.

Therefore, the output of the QHR circuit 200 with r=0 may be fed to another HQR circuit with r=1 in order to perform the four ARX operations of the ChaCha20 round.

In certain implementations, a system for implementing a stream cipher may comprise one or more half-round (HR) circuits configured to perform a half of the number of transformations of a cipher computation round on the round input state. As noted herein above, a single QHR circuit operates on a 128-bit input state. Therefore, in order to process the 512-bit input state of the ChaCha20 round, the HR circuit may comprise four quarter-half-round (QHR) computation circuits operating in parallel, wherein each QHR circuit is configured to implement the transformations on a respective part of the round input state.

Figure 3:
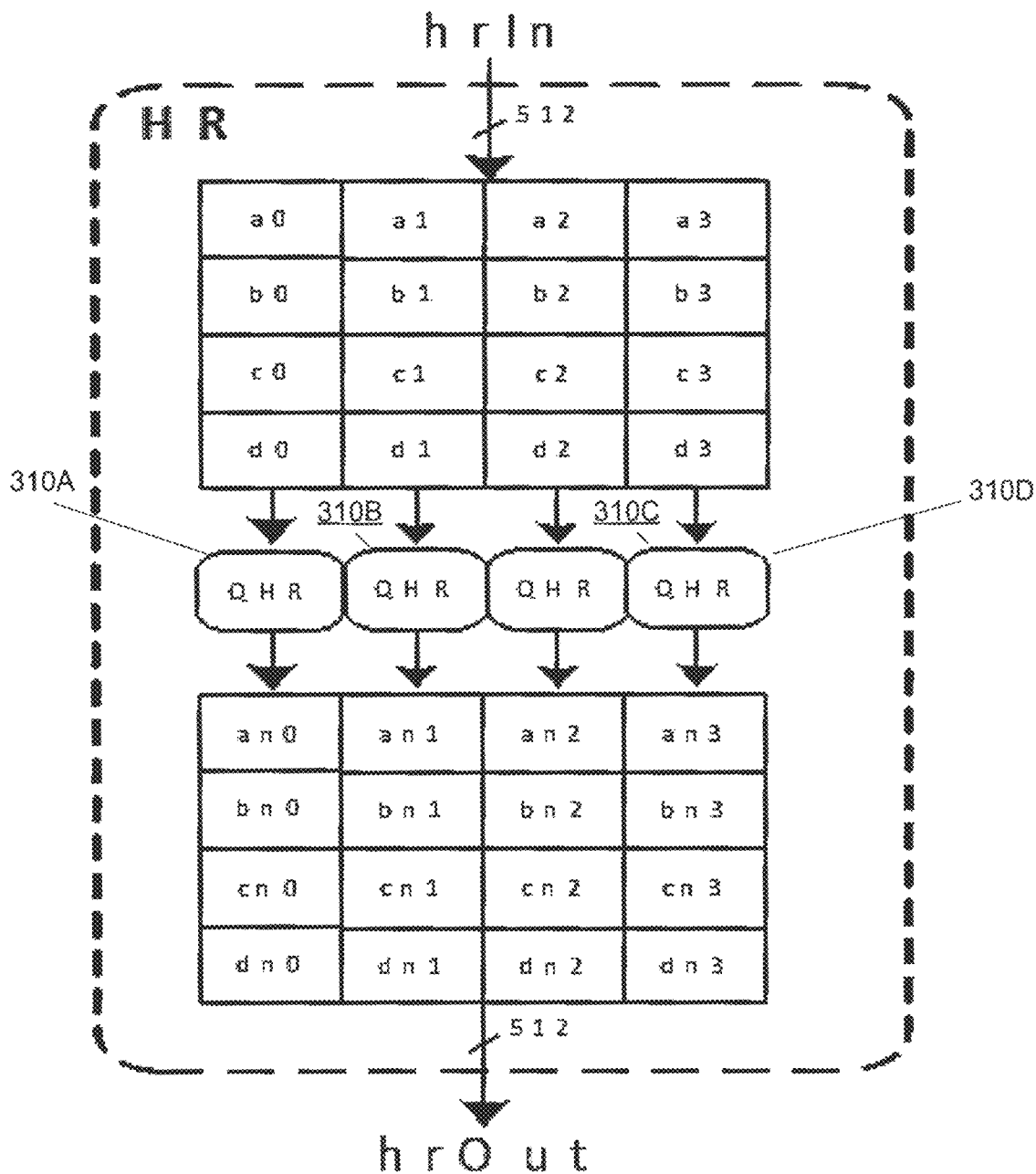
FIG. 3 schematically illustrates an example implementation of a half-round (HR) operation by four parallel QHR circuits, in accordance with one or more aspects of the present disclosure.

As schematically illustrated by FIG. 3, the HR operation may be implemented by four parallel QHR circuits operating in parallel to process the 512-bit input state. Each QHR circuit 310A-310D processes the respective 128-bit input state composed of four 32-bit words $a_i$, $b_i$, $c_i$, and d, and performs two ARX operations (i.e., two of the four transformations of the ChaCha20 round) to produce the respective 128-bit output state composed of four 32-bit words $an_i$, $bn_i$, $cn_i$, and $dn_i$. Thus, the HR operation performs two of the four transformations of the ChaCha20 round on the 512-bit input state using the same number of ARX circuits as two QR operations running in parallel, while reducing by a half the critical path.

As noted herein above, in order to implement the cipher in an efficient manner, all rounds of the cipher should be performed within the number of cycles that does not exceed the number of input words that can be loaded into the processing core via the core interface (i.e., one clock cycle per input word), thus avoid introduction of idle cycles. In the example of ChaCha20, which performs twenty rounds to produce a 512-bit key stream, the twenty rounds should be completed in sixteen clock cycles or less (assuming the width of the internal bus of 32 bits).

In certain implementations, a system for implementing a stream cipher may comprise one or more triple-half-round (THR) computation circuits. Each THR computation circuit may execute three HR functions within one clock cycle. Therefore, 39 half-rounds of the 40 half-rounds of ChaCha20 cipher would be executed within 13 clock cycles, and the remaining half-round operation would be completed within another clock cycle, thus requiring 14 clock cycles for processing the 512-bit input state.

Figure 4:
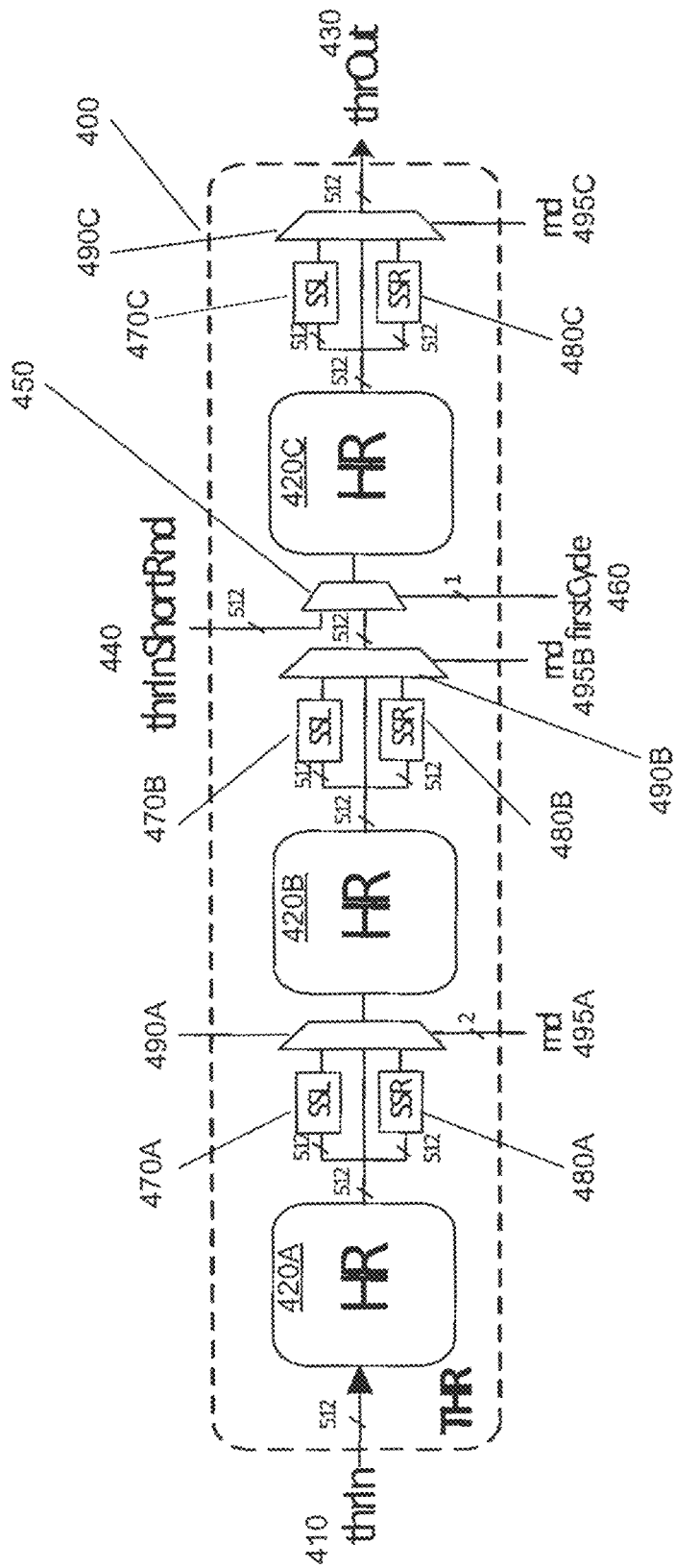
FIG. 4 schematically illustrates an example circuit for implementing a triple half-round (THR) operation, in accordance with one or more aspects of the present disclosure.

FIG. 4 schematically illustrates an example THR circuit, in accordance with one or more aspects of the present disclosure. As schematically illustrated by FIG. 4, the example THR circuit 400 accepts the 512-bit input thrIn 410 and sequentially processes it by three HR circuits 420A-420C to produce the 512-bit output thrOut 430. Each HR circuit 420A-420C may be implemented by as four parallel QHR circuits 200, as described in more detail herein above with reference to FIG. 3.

The number of half-rounds (forty) in the example cipher implementation is not a multiple of three (which is the number of consecutive HR operations performed by the example THR circuit 400 in a single clock cycle). Therefore, in certain implementations, the THR circuit 400 may perform the first HR operation in the first clock cycle, such that the input of the first HR operation is accepted via thrInShortRnd line 440 controlled by the multiplexer 450. The control input firstCycle 460 may drive the multiplexer 450 to feed, to the HR operation 420C, either the input line 440 or the output of the HR operation 420A and 420B. The output of each iteration, except for the last one, may be fed back to the input line than 410. Thus, the THR circuit 400 may perform the first half-round operation in the first clock cycle, and then perform thirty-nine THR operations in the second to fourteenth clock cycles. Alternatively, the THR circuit may perform thirty-nine THR operations in the first to thirteenth clock cycles and perform the remaining half-round operation in the fourteenth clock cycle. Thus, during the output of each 512-bit block of the message to be encrypted, the THR circuit 400 may calculate the key stream to be utilized for the subsequent 512-bit block, thus requiring 16 clock cycles for 32-bit input/output data path. Thus, the example circuit 400 of FIG. 4 reduces the critical path by 25% in comparison with certain common ChaCha20 implementations and produces a continuous encryption flow with 32-bit input/output, by performing forty THR operations in fourteen clock cycles (i.e., achieving the same single-cycle encryption feature as certain common ChaCha20 implementations).

Figure 5A:
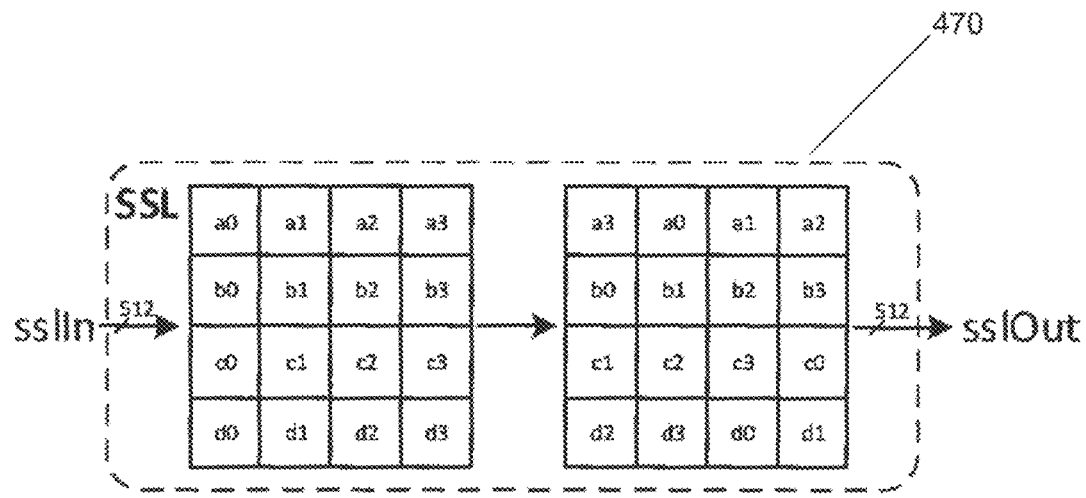
FIGS. 5A-5B schematically illustrate operations of state shift left (SSL) and state shift right (SSR) modules employed by the example THR circuit, in accordance with one or more aspects of the present disclosure.
Figure 5B:
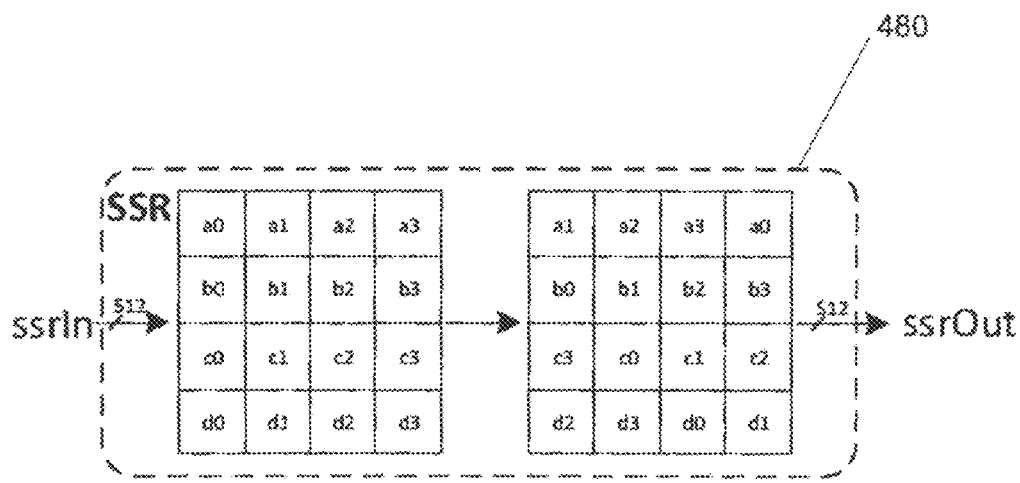

The state shift left (SSL) modules 470A-470C and state shift right (SSR) modules 480A-480C are utilized for shifting the state row in order to implement the interleaving of column-wise and diagonal-wise computations, in accordance with the cipher specification. Thus, as schematically illustrated by FIG. 5A, each SSL module 470 cyclically shifts to the left the first, third, and fourth row of the state by three, one, and two words, respectively, in order to align the diagonal words to columns. Conversely, as schematically illustrated by FIG. 5B, each SSR module 480 cyclically shifts to the right the first, third, and fourth row of the state by three, one, and two words, respectively, in order to restore the columns that have previously been shifted by the SSL modules 470. Each of multiplexers 480A-480C, controlled by the respective two-bit input 495A-495C, sequentially selects the output of the respective HR circuit 420A-420C, SSL module 470A-470C, or SSR module 480A-480C, for feeding to the next HR circuit 420B-420C or to the output line 430.

Figure 6:
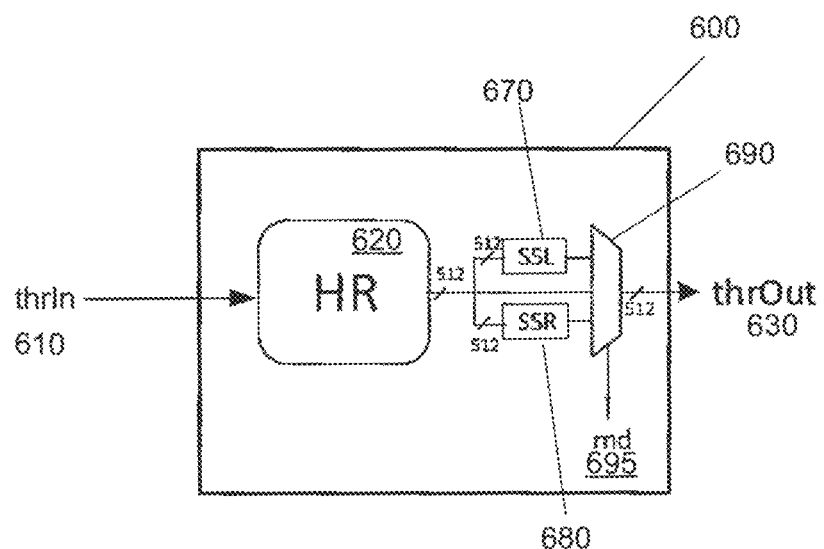
FIG. 6 schematically illustrates an example circuit for implementing a HR operation, in accordance with one or more aspects of the present disclosure.

In certain implementation, the QHR circuits implementing an HR function may be employed by a circuit that is optimized for area and power requirements. As schematically illustrated by FIG. 6, the example HR circuit 600 accepts the 512-bit input thrIn 610 and processes it by a single HR circuit 620 to produce the 512-bit output thrOut 630. The HR circuit 620 may be implemented by four parallel QHR circuits 200, as described in more detail herein above with reference to FIG. 3. The multiplexer 690, controlled by the two-bit input 695, sequentially selects the output of the HR circuit 620, SSL module 670, or SSR module 680, for feeding to the output line 630. As the example circuit 600 performs half a round operation in each cycle, generating a full 512-bit ChaCha20 key stream would require 40 cycles, while significantly reducing the implementation are in comparison with other implementations (e.g., the implementation area of the example circuit 600 is one third of the implementation area of the example circuit 400).

Thus, the present disclosure improves the efficiency of stream cipher computation, by providing example systems for implementing in a stream cipher described herein. In certain implementations, a system for implementing a stream cipher may comprise one or more sub-round computation circuits of the first type (e.g., HR circuit 300 described herein above with reference to FIG. 3). Each sub-round computation circuit of the first type may be configured to perform a subset of transformations of a cipher computation round on the round input state. Each transformation may include one or more ARX operations, e.g., bitwise addition operations, bitwise exclusive disjunction operations, and/or bitwise rotation operations. In an illustrative example, the sub-round computation circuit of the first type (e.g., the HR circuit) may be configured to perform two addition-rotation-XOR (ARX) transformations. In an illustrative example, the sub-round computation circuit of the first type (e.g., the HR circuit) may be configured to perform the subset of transformations of the cipher computation round within a single clock cycle, as described in more details herein above.

The sub-round computation circuit of the first type may comprise a plurality of sub-round computation circuits of the second type (e.g., QHR circuit 200 described herein above with reference to FIG. 2) operating in parallel. Each sub-round computation circuit of the second type may be configured to perform the subset of transformations of the cipher computation round on a respective part of the round input state, as described in more details herein above.

In an illustrative example, each sub-round computation circuit of the second type (e.g., the QHR circuit) may comprise a first rotating logic circuit and a second rotating logic circuit coupled to a multiplexer controlled by an input signal reflecting the parity of the clock cycle sequential number. The first rotating logic circuit may be configured to perform bitwise rotation operations corresponding to a first subset of transformations of the cipher computation round and the second rotating logic circuit may be configured to perform bitwise rotation operations corresponding to a second subset of transformations of the cipher computation round, as described in more details herein above.

In an illustrative example, the system for implementing the stream cipher may comprise multiple sub-round computation circuits of the first type connected in series to produce the specified number of rounds of the cipher. In another illustrative example, the system for implementing the stream cipher may comprise multiple sub-round computation circuits of the first type connected in parallel based on a specified size of the cipher round, as described in more details herein above.

In certain implementations, a system for implementing a stream cipher may comprise one or more HR circuits configured to perform a half of the number of transformations of a cipher computation round on the round input state. Each transformation may include one or more ARX operations, e.g., bitwise addition operations, bitwise exclusive disjunction operations, and/or bitwise rotation operations. In an illustrative example, the HR circuit may be configured to perform two addition-rotation-XOR (ARX) transformations, as described in more details herein above. The HR circuit may comprise four quarter-half-round (QHR) computation circuits operating in parallel, wherein each quarter half-round circuit is configured to implement the transformations on a respective part of the round input state.

In certain implementations, a system for implementing a stream cipher may comprise one or more triple-half-round (THR) computation circuits. Each THR computation circuit may comprise three HR computation circuit connected in series. The HR circuit may be configured to perform a half of the number of transformations of a cipher computation round on the round input state. Each transformation may include one or more ARX operations, e.g., bitwise addition operations, bitwise exclusive disjunction operations, and/or bitwise rotation operations. In an illustrative example, the HR circuit may be configured to perform two addition-rotation-XOR (ARX) transformations, as described in more details herein above. The HR circuit may comprise four quarter-half-round (QHR) computation circuits operating in parallel, wherein each quarter half-round circuit is configured to implement the transformations on a respective part of the round input state.

In an illustrative example, the system for implementing the stream cipher may comprise multiple THR circuits connected in series to produce the specified number of rounds of the cipher. In another illustrative example, the system for implementing the stream cipher may comprise multiple THR circuits connected in parallel based on a specified size of the cipher round, as described in more details herein above.

In an illustrative example, the system for implementing the stream cipher may be configured to perform the cipher computation round within fourteen clock cycles, as described in more details herein above.

Figure 7:
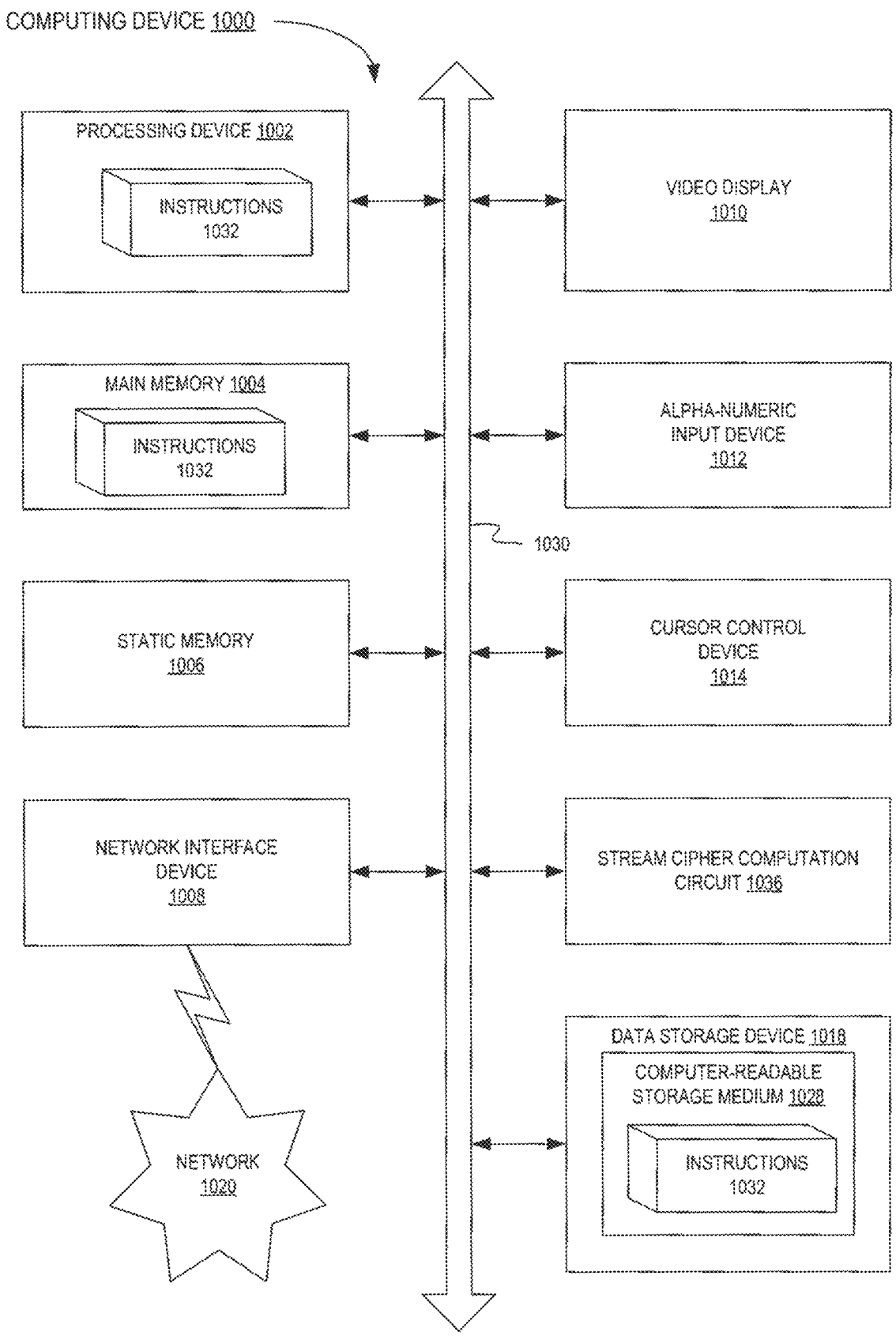
FIG. 7 schematically illustrates a diagrammatic representation of an example computing system which may incorporate the stream cipher computation circuits described herein and within which a set of instructions, for causing the computing device to perform the methods described herein, may be executed.

FIG. 7 schematically illustrates a diagrammatic representation of a computing system 1000 which may incorporate stream cipher computation circuits described herein and within which a set of instructions, for causing the computing device to perform the methods described herein, may be executed. Computing system 1000 may be connected to other computing devices in a LAN, an intranet, an extranet, and/or the Internet. The computing device may operate in the capacity of a server machine in client-server network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods described herein.

The example computing system 1000 may include a processor (also referred to as "central processing unit" (CPU)) 1002, which in various illustrative examples may be a general purpose or specialized processor comprising one or more processing cores. The example computing system 1000 may further comprise a main memory 1004 (e.g., synchronous dynamic random access memory (DRAM), read-only memory (ROM)), a static memory 1006 (e.g., flash memory and a data storage device 1018), which may communicate with each other via a bus 1030. The processing device 1002 may be configured to execute methods for performing the operations and steps described herein.

The example computing system 1000 may further include a network interface device 1008 which may communicate with a network 1020. The example computing system 1000 also may include a video display unit 1010 (e.g., a liquid crystal display (LCD) or a cathode ray tube (CRT)), an alphanumeric input device 1012 (e.g., a keyboard), and a cursor control device 1014 (e.g., a mouse). In one embodiment, the video display unit 1010, the alphanumeric input device 1012, and the cursor control device 1014 may be combined into a single component or device (e.g., an LCD touch screen).

The data storage device 1018 may include a computer-readable storage medium 1028 on which may be stored one or more sets of instructions 1032 implementing any one or more of the methods or functions described herein. Instructions 1032 implementing the methods or functions described herein may also reside, completely or at least partially, within the main memory 1004 and/or within the processing device 1002 during execution thereof by the example computing system 1000, hence the main memory 1004 and the processing device 1002 may also constitute or comprise computer-readable media. The instructions may further be transmitted or received over the network 1020 via the network interface device 1008.

While the computer-readable storage medium 1028 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Computing system 1000 may include stream cipher computation circuits 1036 described herein (e.g, one or more QHR circuits, one or more HR circuits, and/or one or more THR circuits). In certain implementations, a stream cipher computation circuit implemented in accordance with one or more aspects of the present disclosure may be incorporated into the processor 1002.

Unless specifically stated otherwise, terms such as "updating", "identifying", "determining", "sending", "assigning", or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to a system for performing the methods described herein. This system may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other system. Various general purpose systems may be used in accordance with the teachings described herein, or it may prove convenient to construct more specialized system to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A system for implementing a stream cipher, comprising:

a half-round (HR) computation circuit configured to perform a half of a number of transformations of a cipher computation round on a round input state, each transformation of the subset of transformations including at least one of: a bitwise addition operation, a bitwise exclusive disjunction operation, or a bitwise rotation operation, wherein the HR computation circuit comprises:

four quarter-half-round (QHR) computation circuits, wherein each QHR computation circuit is configured to perform two transformations of the cipher computation round on a respective quarter of the round input state, and wherein each sub-round computation circuit comprises a first rotating logic circuit and a second rotating logic circuit coupled to a multiplexer controlled by an input signal reflecting a parity of a clock cycle sequential number.

2. The system of claim 1, wherein the HR computation circuit is configured to perform the subset of transformations of the cipher computation round within a single clock cycle.

3. The system of claim 1, wherein the first rotating logic circuit is configured to perform a first number of bitwise rotation operations corresponding to a first subset of transformations of the cipher computation round and the second rotating logic circuit is configured to perform a second number of bitwise rotation operations corresponding to a second subset of transformations of the cipher computation round.

4. The system of claim 1, comprising multiple computation HR circuits connected in series to produce a specified number of rounds of the cipher.

5. The system of claim 1, comprising multiple computation HR circuits connected in parallel.

6. The system of claim 1, wherein two or more QHR computation circuits are connected in series to produce a specified number of rounds of the cipher.

7. The system of claim 1, wherein two or more QHR computation circuits are connected in parallel.

* * * * *